US008706697B2

(12) United States Patent
Morsi et al.

(10) Patent No.: US 8,706,697 B2
(45) Date of Patent: Apr. 22, 2014

(54) DATA RETENTION COMPONENT AND FRAMEWORK

(75) Inventors: Magdi Morsi, Bellevue, WA (US); Ying Sun, Sammamish, WA (US); Wai Ho Au, Bellevue, WA (US); Sanjeev Katariya, Bellevue, WA (US); Scott Sovine, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 319 days.

(21) Appl. No.: 12/972,320

(22) Filed: Dec. 17, 2010

(65) Prior Publication Data

US 2012/0158669 A1 Jun. 21, 2012

(51) Int. Cl.
*G06F 17/30* (2006.01)

(52) U.S. Cl.
USPC .......................................... 707/661; 707/689

(58) Field of Classification Search
USPC .................................................. 707/662, 689
See application file for complete search history.

(56) References Cited

U.S. PATENT DOCUMENTS

| | | | | |
|---|---|---|---|---|
| 6,757,778 | B1 * | 6/2004 | van Rietschote | 711/6 |
| 7,343,453 | B2 | 3/2008 | Prahlad et al. | |
| 7,380,064 | B2 | 5/2008 | Murotani et al. | |
| 7,441,096 | B2 * | 10/2008 | Kitamura | 711/203 |
| 7,899,850 | B2 * | 3/2011 | Slik et al. | 707/822 |
| 2005/0021566 | A1 * | 1/2005 | Mu | 707/200 |
| 2005/0065961 | A1 * | 3/2005 | Aguren | 707/102 |
| 2005/0210041 | A1 | 9/2005 | Taguchi | |
| 2005/0216532 | A1 * | 9/2005 | Lallier | 707/204 |
| 2007/0288535 | A1 * | 12/2007 | Shitomi et al. | 707/204 |
| 2008/0263112 | A1 * | 10/2008 | Shaath et al. | 707/204 |
| 2008/0313296 | A1 | 12/2008 | Muller | |
| 2009/0216796 | A1 * | 8/2009 | Slik et al. | 707/103 R |
| 2010/0011368 | A1 * | 1/2010 | Arakawa et al. | 718/104 |
| 2010/0106689 | A1 * | 4/2010 | Huslak | 707/662 |
| 2010/0138500 | A1 * | 6/2010 | Consul et al. | 709/206 |
| 2010/0180281 | A1 * | 7/2010 | Chandra et al. | 719/319 |
| 2010/0274826 | A1 * | 10/2010 | Takata et al. | 707/812 |
| 2010/0313066 | A1 * | 12/2010 | Hanes | 714/6 |
| 2010/0333181 | A1 * | 12/2010 | Burns | 726/4 |
| 2011/0067113 | A1 * | 3/2011 | Jones et al. | 726/27 |
| 2012/0023145 | A1 * | 1/2012 | Brannon et al. | 707/822 |

OTHER PUBLICATIONS

Electronic Data Retention Policy—Published Date: 2002 http://www.sans.org/reading_room/whitepapers/backup/electronic-data-retention-policy_514.

(Continued)

*Primary Examiner* — Fred I Ehichioya
*Assistant Examiner* — Richard Bowen
(74) *Attorney, Agent, or Firm* — Andrew Sanders; Micky Minhas

(57) ABSTRACT

Systems and methods for dynamically managed data retention are described. The system comprises a tiered framework having a plurality of namespaces. The namespaces are configured by a user to have selected data retention attributes. Data including a manifest may be received by the system, processed, and directed to a namespace based upon the manifest. Data storage partitions may be created automatically in association with a namespace, and the data partitions may be assigned partition attributes. Data in a storage partition may be migrated automatically to another namespace based on the partition attributes. Code necessary for creating storage partitions and migrating data is generated by the data management system.

20 Claims, 5 Drawing Sheets

(56) References Cited

OTHER PUBLICATIONS

Windows Server 2008 R2 File Classification Infrastructure—Managing data based on business value—Published Date: May 11, 2009 http://blogs.technet.com/b/filecab/archive/2009/05/11/windows-server-2008-r2-file-classification-infrastructure-managing-data-based-on-business-value.aspx.

Veritas Software: The Foundation for Tiered Storage—Published Date: Apr. 2005 eval.veritas.com/downloads/news/ESG-Tiered.pdf.

Tips for data retention and purging—Retrieved Date: Sep. 1, 2010 http://www.infostor.com/index/articles/display/292641/articles/infostor/volume-11/issue-5/features/tips-for-data-retention-and-purging.html.

IBM Information Archive: The Next Generation Information Retention Solution—Retrieved Date: Sep. 1, 2010 http://www-03.ibm.com/systems/storage/disk/archive/index.html.

IBM System Storage Multilevel Grid Access Manager Software—Retrieved Date: Sep. 1, 2010 http://www-03.ibm.com/systems/storage/software/gam/.

F5 Acopia Intelligent File Virtualization and IBM Network Attached Storage—Copyright Date: 2007 www.f5.com/pdf/solution-center/f5-ibm-nas-sb.pdf.

* cited by examiner

DATA RETENTION COMPONENT AND FRAMEWORK

BACKGROUND

In the Information Age, the amount of electronic data that is handled and managed by organizations seemingly continues to grow without limit. Storing all electronic data handled within an organization may no longer be feasible due to costs associated with providing and maintaining data storage hardware as well as back-up storage capabilities, and costs associated with data management services. Currently, some organizations practice a hold-and-delete approach to data retention, where data may be held in storage for a period of time and then permanently deleted. In such an implementation, all electronic data may be assigned a retention period as it is received or created by an organization. After the assigned retention period, the data may be deleted.

There may be several difficulties associated with the storing and management of vast amounts of data. For example, it may be difficult or costly to keep track of what data is stored on what type of data storage medium and how long the data is to be retained on the storage medium. Additional management burdens can be incurred when old data storage devices are phased out and new devices introduced to a system. Further, removal of data can be time consuming when based on search-and-delete methods.

SUMMARY

The present invention is directed to apparatus and methods for dynamically and automatically managing retention of electronic data, so that data retention can be matched to data storage resources available to an organization and to the needs of the organization. According to embodiments of the invention, data stores may be partitioned automatically and/or created by a data management system as data is received to meet the needs of the data. The partitioning may be carried out on one type of storage media or a plurality of different types of storage media. Data storage partitions may be associated with a plurality of namespaces that are logical elements of a hierarchical structure used for organizing and managing the data storage partitions. Stored data may be automatically migrated from a first data storage partition in a first type of storage media to a second data storage partition in a second type of storage media as data ages, e.g., moved from a fast-access storage media to a slower storage media. Code necessary for partitioning data stores and migrating data may be generated automatically by the data management system. The apparatus and methods of the invention are useful for handling and managing large amounts of data, e.g., data received from thousands or millions of data providers on a daily basis.

Embodiments of the invention include a data management system comprising at least one namespace and at least one processor configured to perform acts of data retention. The acts of data retention include receiving first data, the first data identifying an address of a sender of the data, and forwarding the first data to a preexisting first namespace having first data retention attributes. The forwarding may be based on the address of the sender. The acts further include creating automatically, by the at least one processor, at least one first storage partition associated with the first namespace, wherein the at least one first storage partition has at least a portion of the first data retention attributes. The at least one processor of the data management system may further be configured to perform acts of storing the first data in the at least one first storage partition, and automatically migrating data in the first storage partition to a second namespace, wherein the second namespace has second data retention attributes that are different, at least in part, from the first data retention attributes. The migrating of data may be responsive to an expiration of the first storage partition.

Embodiments of the invention also include methods for data retention. One method of data retention comprises acts of receiving, by at least one processor of a data management system, first data and a first manifest associated with the first data, wherein the first manifest identifies first data retention attributes for the first data, and creating, by the at least one processor, first partition metadata based at least upon the first manifest, wherein the first partition metadata identifies first storage partition attributes. The method may further comprise forwarding the first data and the first partition metadata to a preexisting first namespace having at least a portion of the first data retention attributes, and creating automatically, by the at least one processor, at least one first storage partition associated with the first namespace, wherein the at least one first storage partition has at least the first storage partition attributes identified in the first partition metadata. The method for data retention may also include acts of storing the first data in the at least one first storage partition, and automatically migrating data from the first storage partition to a second namespace. The migrating of data may be responsive to an expiration of the first storage partition, for example. The migrating of data may be responsive to an access rate or frequency of data in the first storage partition, in some embodiments.

It will be appreciated that the invention may be embodied in a manufactured, non-transitory, computer-readable medium as computer-executable instructions or code. In various embodiments, the instructions are read by at least one processor and adapt the at least one processor to perform a method as described above, or methods of alternative embodiments of the invention as described below.

As one example, the invention includes at least one non-transitory computer-readable medium including instructions that, when executed by at least one processor, cause the at least one processor to perform acts of (a) receiving, by at least one processor of a data management system, first data; (b) creating, by the at least one processor, first partition metadata and/or code for creating automatically at least one first storage partition having first storage partition attributes; (c) forwarding the first data and the first partition metadata and/or code to a preexisting first namespace having first data retention attributes; (d) creating automatically, by the at least one processor, the at least one first storage partition associated with the first namespace, wherein the at least one first storage partition has at least the first storage partition attributes; (e) storing the first data in the at least one first storage partition; and (e) automatically migrating data from the first storage partition to a second namespace having second data retention attributes. The migrating of data may be responsive to an expiration of the first storage partition.

The foregoing and other aspects, embodiments, and features of the invention can be more fully understood from the following description in conjunction with the accompanying drawings. The foregoing is a non-limiting summary of the invention, which is defined by the attached claims.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

I. Overview

Figure 1:
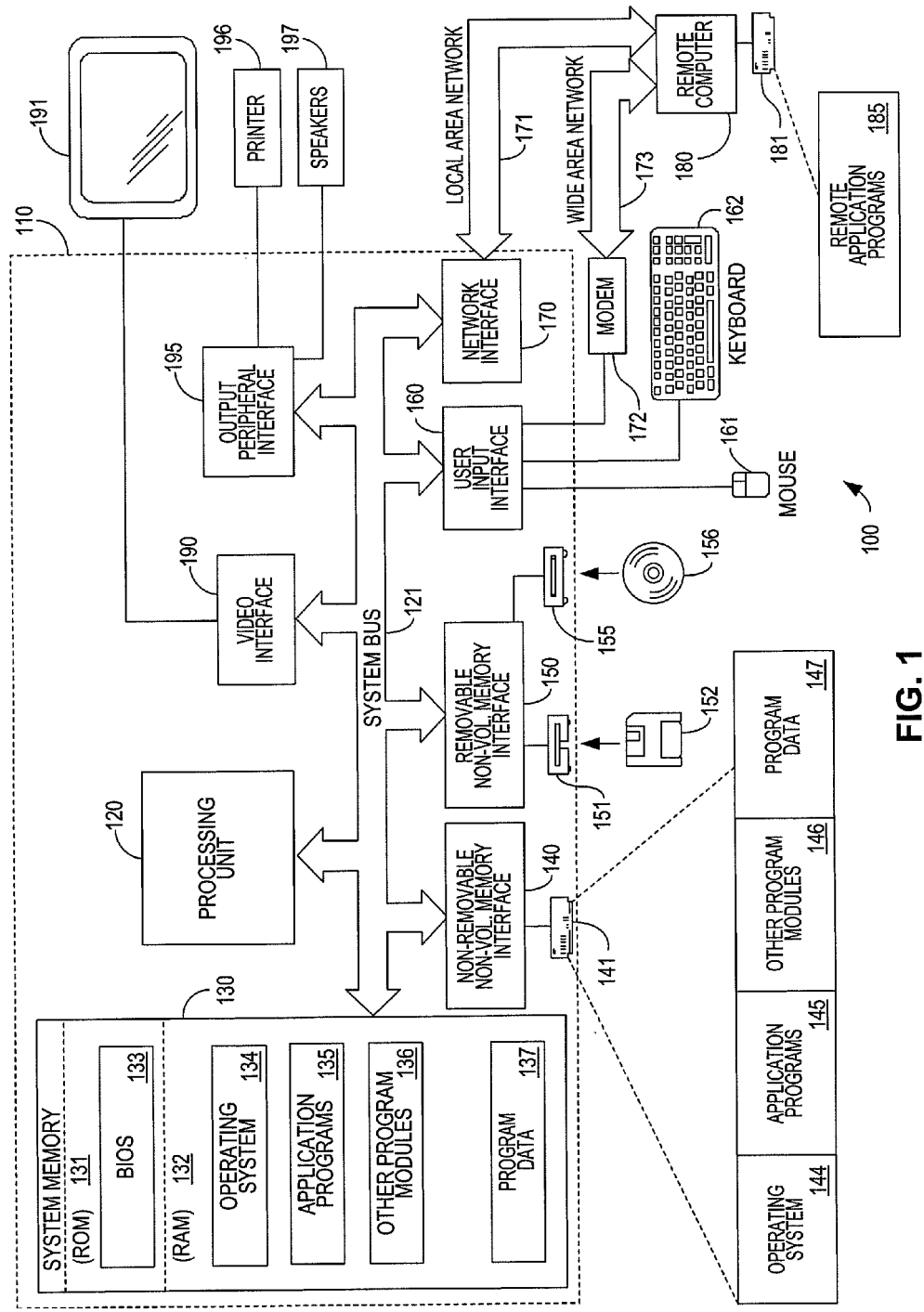
FIG. 1 is a block-diagram representation of an embodiment of a computing system on which embodiments of the present invention may be implemented.

The Applicants have recognized that data retention for vast amounts of data can pose significant challenges in some computing systems, e.g., in the areas of retaining and managing data associated with software development and deployment, medical records, government agencies, and legal records. In such data management systems, large amounts of data may be received over a local area network or wide area network on a daily or hourly basis. As one example in the area of software deployment, error or bug reports may be received from hundreds or thousands of computers connected to the Internet on a daily basis after a commercial release of new software. The error reports may need to be held for a period of time in a manner to provide convenient access to the data, so that analysis of the error reports can be carried out. The retention and management of vast amounts of data can tax limited hardware resources as well as incur costs associated with managing the data so that current data is readily available and older data is archived or removed from the system.

The Applicants have also recognized that in many instances, value of the data changes over time. For example, data that is received one day (e.g., a new bug report, new legal documents, new medical documents) may be of high interest for a first period of time. During this first period of time, frequent and quick access to the data may be desirable. After this period, however, access to the data may be less frequent or not at all (e.g., a bug is fixed, a legal case is closed). Accordingly, it may not be necessary to retain data on prime storage media after the "value" of the data decreases, and in some cases it may be acceptable to delete the data altogether.

In consideration of the foregoing, the Applicants have devised a dynamic data management system comprising a logic layer above the physical storage solutions for actively and automatically managing data retention within the system. In overview, the data management system comprises a plurality of namespaces that are configured by a user of the system. Each namespace has associated with it data retention attributes. The data retention attributes may identify how data for storage is to be managed within the namespace. Data for storage may be piped to a namespace based upon a manifest or an identifier associated with the data.

In some embodiments, the data management system may automatically generate code to create data storage partitions associated with each namespace, and to migrate data from a first partition within a first namespace to a second partition in a second namespace. There may be one or more data storage partitions associated with each namespace. The code for migrating data may include code that transforms the data from a first XML representation to a second XML representation or to some other representation.

The creation of partitions and migrating of data may be carried out automatically by the data management system, e.g., without any interaction necessary on the part of an end user. A system user may only need define data retention attributes for setting up one or more namespaces. Subsequent data storage interactions with the system may then be based only on sending data to the one or more namespaces.

Further aspects and features of the invention will be described in greater detail below.

II. Computing System

FIG. 1 illustrates an example of a suitable computing system environment 100 on which embodiments of the data management system and methods may be implemented. The computing system environment 100 is only one example of a suitable computing environment and is not intended to suggest any limitation as to the scope of use or functionality of the aspects of the invention, as the aspects of the invention described herein can be used with any computing system. Neither should the computing environment 100 be interpreted as having any dependency or requirement relating to any one or combination of components illustrated in the exemplary computing environment 100.

FIG. 1 illustrates a general purpose computing device in the form of a computer 110. Components of computer 110 may include, but are not limited to, a processing unit 120, a system memory 130, and a system bus 121 that couples various system components including the system memory to the processing unit 120. The processing unit 120 may be a microprocessor. The system bus 121 may be any suitable bus structure, such as a memory bus or memory controller, a peripheral bus, and/or a local bus using any suitable bus architectures. By way of example, and not limitation, such architectures may include Micro Channel Architecture (MCA) bus, Video Electronics Standards Association (VESA) local bus, and Peripheral Component Interconnect (PCI) bus also known as Mezzanine bus.

A computer 110 may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Computer 110 may include any one or more of a variety of manufactured computer readable storage media. In various embodiments, the computer readable storage media is non-transitory storage media. Computer readable storage media can be any suitable media that can be accessed by computer 110 and includes volatile and nonvolatile storage media, and removable and non-removable storage media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates an operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic storage media, a magnetic disk drive 151 that reads from or writes to a removable, nonvolatile magnetic disk 152, and an optical disk drive 155 that reads from or writes to a removable, nonvolatile optical disk 156 such as a CD ROM or other optical storage media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 may be connected to the system bus 121 through a non-removable memory interface such as interface 140, and magnetic disk drive 151 and optical disk drive 155 may be connected to the system bus 121 by a removable memory interface, such as interface 150.

The drives and their associated computer storage media, discussed above and illustrated in FIG. 1, may provide storage of computer readable instructions, data structures, program modules and/or other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A computer 110 may have one or more input and output devices. These devices may be used, among other things, to present a user interface. Examples of output devices that may be used to provide a user interface include printers or display screens for visual presentation of output and speakers or other sound generating devices for audible presentation of output. A user may enter commands and information into the computer 110 through input devices such as a keyboard 162 and pointing device 161, commonly referred to as a mouse, trackball or touch pad. Other input devices (not shown) may include a digitizing tablet, microphone, joystick, game pad, satellite dish, scanner, or the like. As another example, a computer may receive input information through speech recognition or in other audible format. These and other input devices may be connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using one or more logical connections to one or more remote computers, such as a remote computer 180. The remote computer 180 may be a personal computer, a server, a router, a network PC, a peer device or other type of network node, and may include many or all of the elements described above relative to the computer 110, although only a memory storage device 181 has been illustrated in FIG. 1. Examples of logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 may be connected to the LAN 171 through a network interface or adapter 170. When used in a WAN networking environment, the computer 110 may include a modem 172 or other component for establishing communications over the WAN 173, such as the Internet. The modem 172, which may be internal or external, may be connected to the system bus 121 via the user input interface 160, or other appropriate mechanism. It will be appreciated that the network connections shown are exemplary and other ways of establishing a communications link between the computers may be used.

In a networked environment, program modules, or portions thereof, depicted relative to the computer 110 may be stored in the remote memory storage device 181. By way of example, and not limitation, FIG. 1 illustrates remote application programs 185 as residing on memory device 181. The remote applications 185 may be accessed and placed into operation by the computer 110 via a network link.

Figure 2:
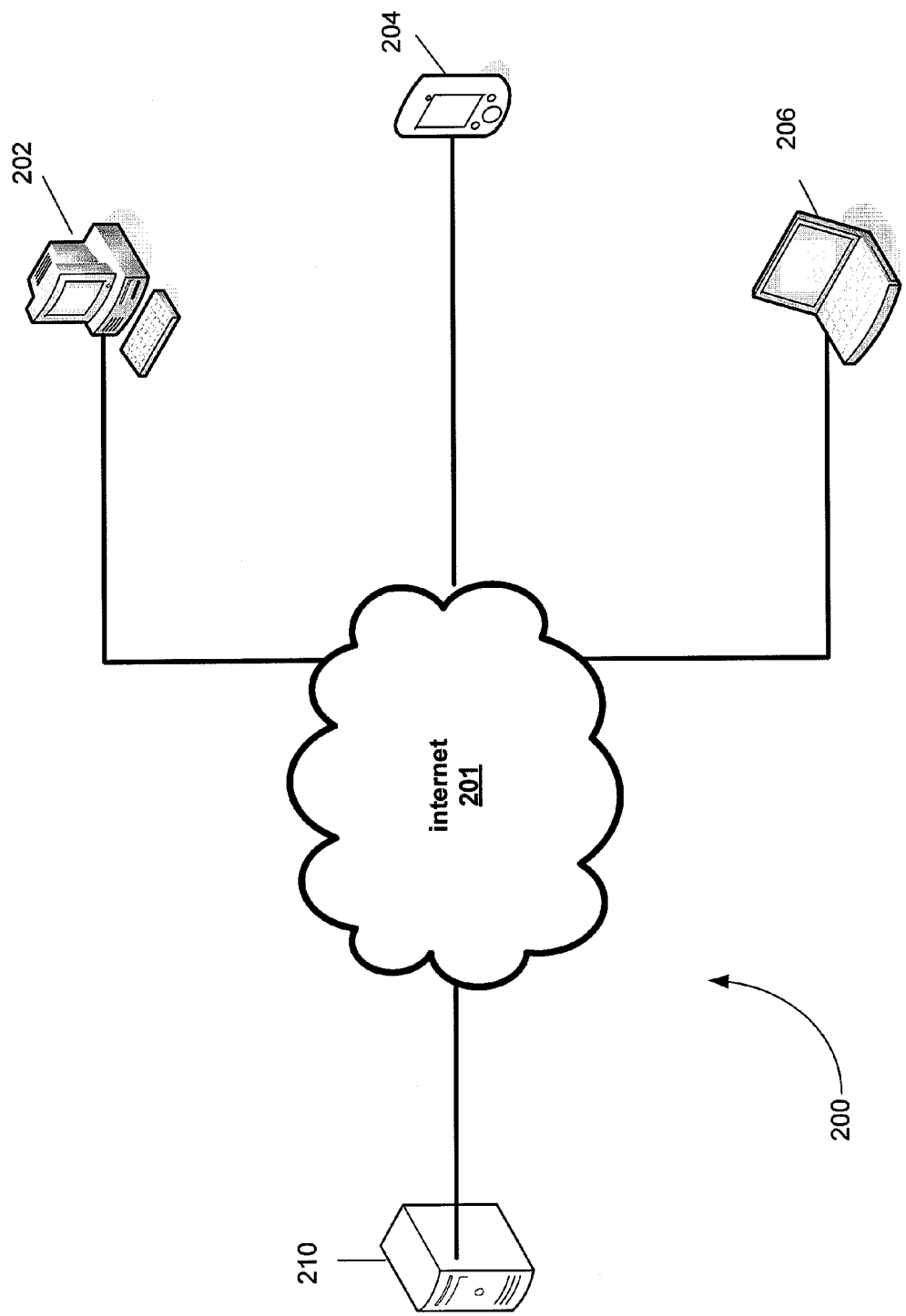
FIG. 2 depicts a computing environment in which embodiments of the invention may be implemented.

FIG. 2 illustrates a higher-level system configuration 200 in which the embodiments of the invention described herein may be implemented. The system 200 includes a number of computing devices 202, 204, and 206 (each of which may be configured as discussed above in connection with computer 110 or otherwise) and may be connected to one or more servers 210 via one or more communications media. In the illustrated example, the communications medium is the Internet 201, but any suitable communications medium or network may be used. The computing devices each may be any suitable computing device capable of executing computer instructions, such as a desktop computer 202, PDA 204, a laptop computer 206, etc. In the illustrated example, the system 200 includes a single instance of a number of different types of computing devices 202, 204 and 206, but the aspects of the invention described herein are not limited in this respect, and can be used to collect information from a single computer, a set of multiple homogeneous types of computers, and/or with any number of instances of any number of different types of computers executing one or more software applications.

In one embodiment, the computers or computing devices coupled to the server 210 may comprise all or a subset of an installed base for a software application loaded onto a plurality of the computers or computing devices. In such an embodiment, each computer or computing device may be configured to provide an error report to the server when an operation error of the software is detected on the computer or computing device providing the error report. In such an embodiment, there may be thousands or millions of computers and computing devices configured to provide error reports to the server 210. The server may be a telemetry server, or telemetry server farm, configured to receive vast amounts of data from the computers or computing systems and provide the data for storage to the data management system of the present invention.

The server 210 may be implemented as a single computer server, or as multiple computer servers configured in any manner (e.g., configured to act as a cohesive system). If server 210 is implemented as multiple computer servers, the multiple servers may be configured in any suitable way. For example, each server in the system may perform a different type of processing, or all the servers may perform the same type(s) of processing but be distributed in such a way as to balance the processing load on any one server. Alternatively, a combination of approaches may be used, e.g., groups of servers may be configured to handle one or more types of processing tasks, and loads balanced among the group. Additionally, other embodiments of the invention may include multiple servers operating independently, such as mirror sites for a single software provider, or multiple servers from a number of different software or hardware providers.

III. Embodiments of the Data Management System and Methods

Figure 3:
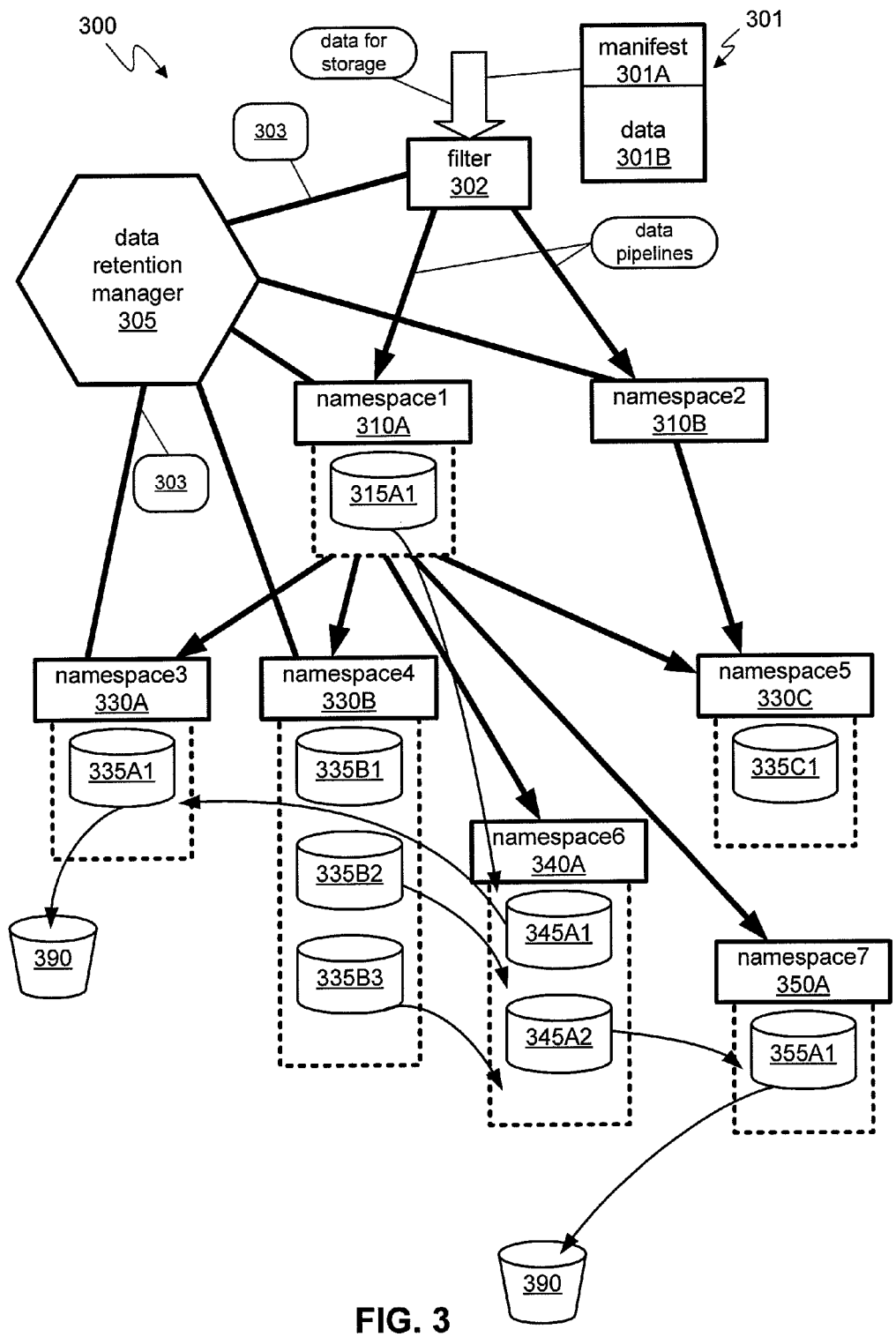
FIG. 3 illustrates an architectural overview of the data management system according to one embodiment of the invention.

FIG. 3 portrays one architecture for the data management system 300 according to one embodiment of the invention. The data management system 300 is not to be limited to the architecture shown in FIG. 3. The data management system may be implemented on a server 210 or multiple servers as described above in connection with FIG. 2. The data management system may comprise a filter 302 and a data retention manager 305 in communication with a plurality of namespaces 310A, 310B, 330A, 330B, 330C, 340A, 350A. (Communication links are not shown to each namespace in the drawing to simplify the drawing.) Each namespace may have at least one associated container or data storage partition: 335A1 associated with namespace 330A; 335B1, 335B2, 335B3 associated with namespace 330B, etc. In FIG. 3, a trash receptacle 390 is depicted to represent deletion of data, and may or may not represent any physical structure in an actual data management system 300.

The filter 302 may comprise any type and form of computer-ware configured to execute the functionality of the filter. The term "computer-ware" is used herein to refer to software, firmware, hardware, or any combination thereof that may be used for adapting a computing system having one or more processors to operate in a desired manner. When referring to software, computer-ware may be used to refer to computer-readable instructions that, when executed by at least one processor, cause the at least one processor to execute one or more process steps according to the functionality for which the software was designed.

The filter 302 may be configured to receive a plurality of data (e.g., software error reports, legal records, medical records) for storing in a data store from one or more providers of data that are external to the data management system 300. Each parcel of received data 301 may be received with an envelope that includes a manifest 301A in some embodiments, and may not include a manifest in other embodiments. In some implementations, the manifest may be in the form of a header included with the data 301. The manifest 301A may be a data structure including data representative of at least one data retention attribute. The filter 302 may process the received data (e.g., access and review the manifest) and forward the data to at least one namespace 310A based on information in the manifest. The filter 302 may also notify data retention manager 305 of the received data by sending a data retention request 303 to the data retention manager. The data retention request 303 may include at least a portion of the manifest 301A that identifies data retention attributes for the received data.

In some implementations, data received by the filter 302 may be forwarded directly to at least one namespace 310A and/or 310B without accessing and processing a manifest. For example, there may be no manifest associated with the incoming data 301. The filter 302 may forward the data 301 to a selected namespace based on an address or URL from which the data is received. In such an embodiment, there may be a mapping (e.g., a look-up table that maps sender address or URL to a namespace) that is accessed by the filter 302 to route the incoming data 301. In such an embodiment, the filter may create and append a manifest to the received data before forwarding to a namespace. In some embodiments, data received by the filter 302 may be shredded and then forwarded to a plurality of namespaces as described below. The shredding of data may comprise at least separating the received data into two or more discrete data parcels.

The data retention manager 305 may comprise any type and form of computer-ware configured to execute the functionality of the data retention manager. In various embodiments, the data retention manager 305 receives and processes data retention requests 303 and participates in the creation of data storage partitions 315A1, 335A1, 335B1, etc. within the namespaces 310A, 330A, 330B. The data retention requests 303 may be a data structure received from any component of the system 300 participating in the management, processing, and/or storage of received data 301, e.g., from filter 302 or any namespace. The data retention manager 305 may also participate in moving data from one namespace to another. The data retention manager 305 may be in communication with the filter 302 and each namespace or at least a portion of the namespaces. The data retention manager 305 may read data retention attributes for each namespace and/or each partition associated with a namespace on a periodic basis (e.g., per day, per week, per month), and initiate acts to manage the data within each namespace and/or each partition responsive to the data retention attributes, e.g., migrate data from a first namespace to a second namespace upon expiry of a partition in the first namespace.

In some embodiments, the data retention manager 305 may monitor access frequency to data in a partition of a namespace or to data within a namespace. For example, a namespace 340A may report access frequency for at least one partition 345A1-345A2 associated with the namespace to the data retention manager 305. In some implementations, the data retention manager may alter at least one data retention attribute for a partition based upon access frequency for that partition. For example, for a partition 345A1 that has a high access frequency, the data retention manager may forward metadata and/or code to the namespace 340A or an agent that uses the metadata and/or code to alter at least one data retention attribute for the partition 345A1. The altering of a data retention attribute for the partition may include instructions to migrate data from the partition to a namespace 330A having greater user accessibility.

As noted above, a data retention request 303 received by the data retention manager may include at least a portion of a manifest associated with received data 301. The manifest may be included in the received data, may be created by the filter 302 (e.g., created based on a sender's address for the received data), or may be created by a user of the system. The data retention request 303 may include data that identifies at least one data retention attribute for the received data 301. The data retention manager may process the request 303 and generate metadata and/or code that may be used by a namespace or any suitable agent for the namespace to create a data storage partition associated with the namespace for the received data. The generated code and/or metadata may be in accordance with at least one data retention attribute identified in the request 303.

Data retention attributes generally specify how received data 301 is to be stored and maintained within the data management system 300. Data retention attributes may include any combination of the following attributes: value of data, anticipated access rate for data, desired storage medium type, desired storage period, action upon expiry of storage period, security level for data, a restriction for the data, and size of data. As one example, a manifest 301A associated with received data 301B may identify one or more data retention attributes for storing the data 301B, e.g., identify the following two data retention attributes: a highest business value for the data and a restriction that the data should be stored no longer than six months. The identified data retention attributes may be passed to the data retention manager 305 in a retention request 303. The data retention manager may then generate code and/or metadata (e.g., generate the code and/or metadata using libraries and/or look-up tables) that can be used by a namespace to create a partition associated with the namespace for the data as needed. The code and/or metadata may be passed to the namespace that receives the data 301 or an agent for the namespace.

A value or business value of data may be identified by the system 300 in any one of a number of ways. As one example, metadata received with the data 301B may identify the data as having a high value. Value of the data may also be identified by a time stamp of the data, a subject matter of the data, or an origination address from which the data came. In one implementation relating to software development, error reports received within a current period of time may be identified as having high business value. In another implementation relating to the medical field, medical records for a patient currently in a hospital may be identified has having high business value. Data of high value may be migrated or forwarded to a namespace having fast-access data storage media.

In some embodiments, data retention attributes are defined for a namespace as part of a process of creating the namespace. For example, a user may create a manifest for a namespace that identifies one or more data retention attributes as described above that are to be used for configuring the namespace. When making a manifest to configure a namespace, a user may seed the manifest with anticipated data retention attributes, e.g., seed the manifest with an expected data access frequency. The data retention attributes defined for the namespace may be used to govern data retention in all data storage partitions created in association with the namespace. In some implementations, partitions associated with the namespace may be given at least some data retention attributes in addition to, or different than, those defined for the namespace. If no data retention attributes are specified for a partition associated with the namespace, the data retention attributes defined for the namespace may be taken as default values for the partition associated with the namespace.

In some embodiments, data retention attributes defined for a namespace or a partition within a namespace may be overridden, e.g., altered by the data retention manager 305. For example, if it is determined that data access frequency for data within a partition or within a namespace is higher than anticipated or higher than a predefined threshold value, a data retention attribute for the partition or namespace may be altered by the data management system. For example, if it is determined that data within a partition is accessed at a frequency above a predefined threshold value when the partition is due to expire (migrated to a data storage medium having slower accessibility, or expunged from the data management system), data retention attributes for the partition or namespace may be reset or altered so as to maintain the partition for a second retention period or to migrate the data to a data storage medium having faster accessibility. The overriding of data retention attributes may be responsive to monitoring access to the data in a storage partition or namespace.

A namespace (330B for example) may include any type and form of computer-ware configured to execute the functionality of the namespace. A namespace may include a data structure in some embodiments. In various embodiments, a namespace represents a logic level in the tiered data management system that is associated with at least one data storage partition 335B1. A namespace may include code that, when executed by at least one processor, causes the at least one processor to store data in association with the namespace and move data into or out of the namespace. A namespace may be set up by a user, and assigned by the user one or more data retention attributes. Data retention attributes for a namespace 330B may include any combination of the data retention attributes described above as well as partition creation frequency and physical storage medium identification for each partition. Data that is forwarded to a namespace for storage may be stored in accordance with the data retention attributes defined for the namespace, or in accordance with data retention attributes defined for the namespace and partition metadata and/or code received in connection with the data forwarded to the namespace. For example, if a data retention attribute for a namespace identifies that data is to be stored on the fastest access data storage medium and migrated off the medium after 12 weeks, then any data forwarded to the namespace may be stored in a partition on a fast-access data storage medium available to the data management system, and migrated off the fast-access medium after 12 weeks. Data may also be shredded or parsed at a namespace and forwarded to one or more other namespaces as described below.

The data storage partitions 315A1, 335A1, 335B1, 335B2, etc. may comprise any type and form of computer-ware configured to store data according to the embodiments of the invention. The data storage partitions 315A1, 335A1, etc. may comprise portions of manufactured data storage medium, e.g., at least one address range identifying at least one portion of at least one data storage medium. Data storage partitions associated with a namespace include any data storage partition that is configured to receive data for storage sent to its associated namespace. Further, a data storage partition associated with a namespace may share at least one data retention attribute defined for its associated namespace. The data storage partitions associated with a namespace need not be on the same physical storage medium or at the same storage location. The data storage partitions associated with a namespace may be distributed on a plurality of data storage machines or may be located on a single data storage machine. The data storage partitions associated with a namespace may be in communication with a namespace via a local area network or wide area network in some embodiments. As described above, the data storage partitions are dynamically created and migrated in accordance with data retention attributes associated with the data and/or namespace.

In operation, the data management system of FIG. 3 may first be configured by a user to have a plurality of namespaces 310A, 330A, 330B, etc. as depicted. The configuration shown in FIG. 3 is only one configuration of many possible configurations and is not intended to be limiting. Because any number of namespaces can be set up by a user, each having selected data retention attributes, the data management system 300 is very flexible for structuring into any configuration desired by a user. Once configured, the data management system 300 may receive data for storage from one or a plurality of data providers that are external to the system. Data for storage may be received by filter 302 and forwarded to at least one namespace 310A. The data may be forwarded based on a manifest associated with the data or based on an attribute of the data (e.g., a sender address or URL, a data topic, a data security level). As an example, data from a first URL may be forwarded to a first namespace 310A and data from a second URL may be forwarded to a second namespace 310B.

Data sent to a namespace 310A may be shredded or parsed and portions of the data sent to one or more namespaces 330A, 330B, 330C for example. The shredding or parsing may be executed according to a schema associated with the namespace that governs the shredding of the data. In addition to shredding the data, metadata may be added to the resulting portions of data that may identify at least one data retention attribute for each portion of the data. The portions of data may be received by namespaces 330A, 330B, 330C, 340A, 350A that direct the data to associated storage partitions as depicted in FIG. 3.

The shredded data may also be marked up at the namespace, or transformed into a representation suitable for storage and/or access at a destination to which the data will be sent. For example, the data may be marked up in a selected XML representation for purposes of facilitating subsequent storage and access to the data, e.g., given an XML representation suitable for searching by a selected SQL server. The XML representation for the data may be selected based upon a storage medium type identified for a target namespace or target partition within a namespace. Code for transforming the data into a selected XML representation may be provided by the data retention manager 305. The code for transforming the data may be available to the data management system from software libraries.

Figure 4:
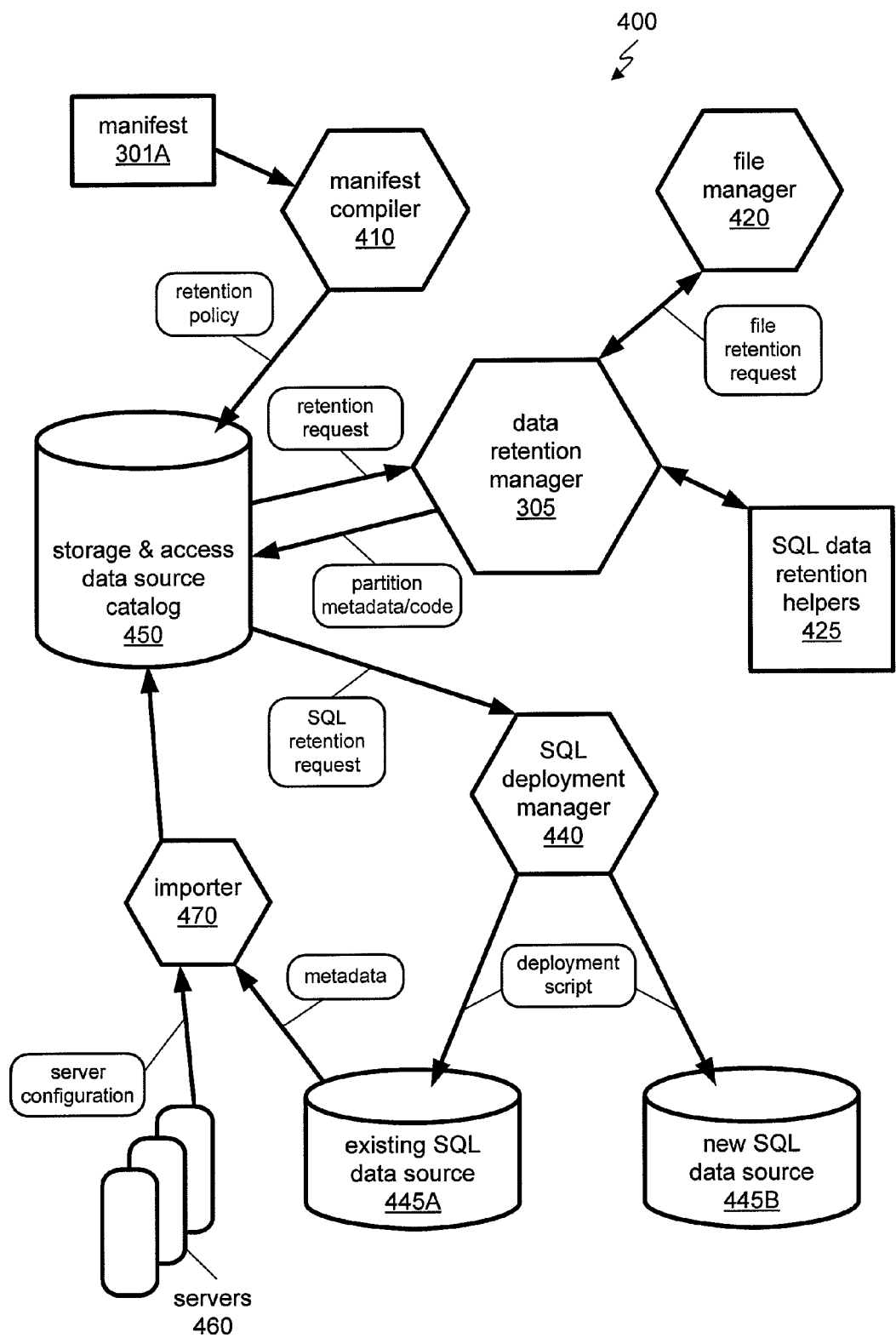
FIG. 4 portrays a hierarchical overview of a computing environment in which the data retention manager operates according to one embodiment of the invention.

Any of the filter 302 or namespaces 310A, 310B, 330A, 330B, etc. may send a data retention request 303 to the data retention manager responsive to receiving data for storage or data for management by the system 300. The data retention manager 305 may return partition metadata and/or code necessary for creating and/or migrating a partition as described above. The partition metadata and/or code may be used by a namespace or an agent for the namespace to create data storage partitions for the received data. An agent for the namespace may be, for example, a SQL deployment manager 440, as depicted in FIG. 4.

The creation of data storage partitions in association with a namespace may be based on partition metadata and/or code provided by the data retention manager 305 as well as data retention attributes defined for the namespace. In some embodiments, the creation of partitions for a namespace may be based on data retention attributes only defined for the namespace. For example, a data retention attribute defined for a namespace 330B may specify that data partitions in the namespace should be retained for a period of six months in the namespace and then migrated to a second namespace 340A. The second namespace may comprise a different type of data storage medium, e.g., a slower access or archival type storage medium.

Upon the expiry of a partition in a namespace, the data management system 300 may automatically generate the code and any necessary partition to migrate a partition from one namespace to another. The system may generate the code with reference to a software library, e.g., a namespace 330B may notify the data retention manager 305 that a partition has reached or is approaching expiry, and the data retention manager may provide the code necessary for migrating the data from the namespace 330B. The data retention manager 305 may also return partition metadata and/or code to a namespace after receiving a data retention request 303 that can be used to migrate data from the created partition upon expiry of the created partition, e.g., metadata and/or code that can be used to create a partition for a different namespace.

It will be appreciated that data partitions may also be expunged from the data management system 300, e.g., deleted or migrated to a trash receptacle 390. The trash receptacle may comprise temporary data storage, e.g., date storage that is purged automatically on a regular or periodic basis.

FIG. 4 depicts an hierarchical overview 400 of the data management system 300 showing an operating environment for the data retention manager 305 according to one embodiment of the invention. In this embodiment, the data retention manager 305 may be in communication with a storage-and-access (SnA) data source catalog 450, a file manager 420, SQL data retention helpers 425, a manifest compiler 410, an importer 470, servers 460, an SQL deployment manager 440, and at least one data source or namespace 445A, 445B. In some embodiments, the functionality of the storage-and-access data source catalog 450, file manager 420, SQL data retention helpers 425, manifest compiler 410, importer 470, and SQL deployment manager 440 may be incorporated into the data retention manager 305.

The manifest compiler 410 may comprise any type and form of computer-ware configured to receive and process a manifest 405 associated with data for storage. The manifest may be included with data received by the system, as shown in FIG. 3 for example, or may be separate from data. In some embodiments, the manifest may be defined by a user for configuring a namespace, and the manifest may not be included with any particular data parcel. The manifest compiler 410 may receive and process a manifest 301A to produce a retention policy that identifies at least one data retention attribute for the data, for a partition in which the data is to be stored, or for a namespace associated with a partition in which the data is to be stored. The retention policy may be transmitted to the SnA data source catalog 450.

The SnA data source catalog 450 may comprise any type and form of computer-ware configured to maintain a record of existing namespaces and server data (e.g., server configurations) associated with the namespaces. Metadata associated with each existing namespace, newly created namespace, and server configuration data may be provided to the SnA data source catalog 450 via an importer 470.

The SnA data source catalog 450 may notify the data retention manager 305 of a received retention policy by sending a retention requirement or request to the data retention manager 305. The data retention manager may process the retention requirement and return partition metadata and/or code to the SnA data source catalog 450. The SnA data source catalog may process and/or forward the partition metadata and/or code, and transmit a SQL retention request to a SQL deployment manager 440. The SQL retention request may include at least a portion of the partition metadata and/or code, or a processed portion thereof, that identifies at least one storage attribute for a data storage partition.

The SQL deployment manager 440 may comprise any type and form of computer-ware configured to create a partition in a namespace or data source 445A, 445B. The SQL deployment manager 440 may be an agent of one or more namespaces. The creation of a partition may be based on the metadata and/or code received in a SQL retention request from the SnA data source catalog 450. In some embodiments, the metadata and/or code necessary for creating a partition may be received directly from the data retention manager 305. The SQL deployment manager 440 may create a data storage partition associated with existing SQL data sources 445A, or may create a partition associated with new data sources 445B that are placed in service. The SQL deployment manager 440 may also participate in migrating data from one partition of one namespace to another partition of another namespace.

Figure 5:
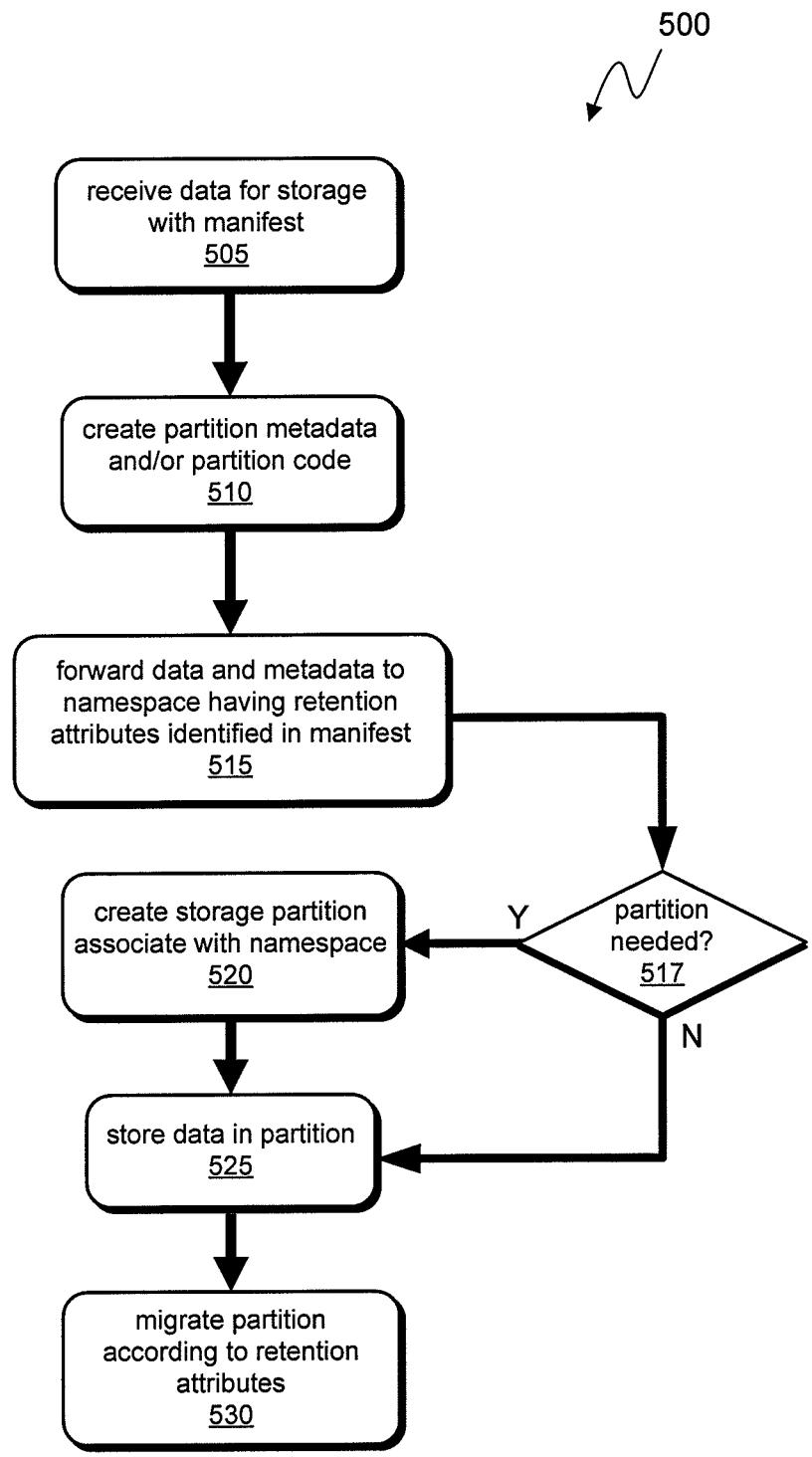
FIG. 5 is a flow diagram depicting a method of data retention according to one embodiment.

FIG. 5 illustrates a flow diagram of a method 500 of data retention according to one embodiment. The illustrated method comprises acts of receiving 505 data for storage, wherein the data may have an associated manifest, and creating 510 partition metadata and/or code. The manifest associated with the data may be included with the data, generated by a filter, or defined by a user. The created partition metadata and/or code may be based on the manifest and used for creating a data storage partition for the data. In some embodiments, the partition metadata may be at least a portion of the manifest data, and may be extracted from the manifest.

The method 500 may further comprise forwarding 515 the data for storage and the metadata and/or code to at least one namespace having at least one data retention attribute identified in the manifest. In some embodiments, the forwarding may be executed by a filter 302. In some embodiments, the forwarding 515 may be based on data in the manifest. In some embodiments, the forwarding may be based on an address or URL of the sender of the data for storage.

In some implementations, data received for storage may be shredded, as part of the act of receiving 505 or forwarding 515, and forwarded to a plurality of namespaces. The shredding may further include formatting portions of the shredded data according to XML representations suitable for storing and accessing the portions of shredded data at their respective destination namespaces.

The data management system 300 may determine 517 whether a partition needs to be created for the received data. For example, a partition may be available with sufficient storage space at a destination namespace, wherein the partition has the necessary data retention attributes for the received data. If a partition is available with sufficient storage space having the required data retention attributes, then the method proceeds to the act of storing 525 the received data in the partition. If a partition is not available, then the method 500 proceeds to the act of creating a storage partition associated with the namespace, wherein the partition has at least one data retention attribute identified in the manifest.

The method 500 may further comprise migrating 530 a partition or data within a partition from a namespace or data source in accordance with at least one data retention attribute defined for the namespace. For example, a data retention attribute for the namespace may indicate that any partition created in the namespace expires at six months from creation. The migrating of data may then occur at the expiry of a partition reaching the end of its six-month period. A data retention attribute for the namespace may also indicate, for example, that any expired partition is to be migrated to a second namespace having a different storage medium type. The act of migrating 530 a partition may include transforming data of the partition from a first XML representation to a second XML representation suitable for storing and accessing the data at the second namespace. The act of migrating 530 may further include automatic generation of code by the data management system 300 (e.g., by the data retention manager) necessary to transform the data in a partition to the second XML representation and move the partition to the second namespace. In some embodiments, migration of data from a first namespace to a second namespace may occur without transforming a representation of the data.

IV. Operational Example

An operational example of the data management system is provided to illustrate operational aspects, usefulness, and advantages of the system and methods, and is not intended to limit the invention in any way. The example encompasses only one implementation, and it will be appreciated that many additional implementations are possible with the data management system. In this example, reference is made to FIG. 3 as one embodiment of the data management system 300.

The data management system 300 may be configured with as many namespaces 310A, 310B, 330A, 330B, etc. and filters 302 as an organization desires to meet the organization's anticipated needs for incoming data to be retained and/or managed. The namespaces and filters can be configured in a hierarchical structure as shown in FIG. 3. For example, data is first received by a first filter 302 or a first namespace, and then parsed to other namespaces under its purview. The data may flow from namespace to namespace through data pipelines. Each filter and namespace may, for example, comprise at least an address (e.g., a network address) to which data and associated metadata and/or code may be sent. Data retention attributes may be defined for each namespace, and the data retention attributes may be different for each namespace. The configuration of the filters and namespaces may be handled through the data retention manager 305 based upon user input.

According to one embodiment, a filter 302 may be configured at a front end of the data management system to route different types of incoming data 301 to different namespaces 310A, 310B. A first type of incoming data may be data associated with software error reports (routed to first namespace 310A), and a second type of incoming data may be data associated with software orders (routed to second namespace 310B). The software orders may be stored temporarily on fast-access storage media in association with the second namespace 310B, and then migrated to a permanent or long-term archive 335C1, e.g., a 5-year, 10-year, or 20-year retention archive.

At the first namespace 410A, data associated with software error reports may be shredded and marked up for subsequent storage and access. An incoming software error report may include at least three types of data parcels, e.g., a parcel identifying BIOS information of a computing system reporting the software error, a parcel identifying a stack trace of the computing system at approximately the time of the software error, and a parcel identifying details of a crash resulting from the software error. The incoming software error report may be formatted according to a selected schema, and the namespace 410A may be configured to process the received data according to the selected schema. Each of the parcels may be separated and marked up, for example into a selected XML representation, suitable for storage and access at a destination namespace 330A, 330B, 340A to which each parcel is sent.

Each of the data parcels may be managed differently by the system 300 based upon the destination namespace. For example, each destination namespace 330A, 330B, 340A may have different data retention attributes associated with it. The data parcel identifying details of a crash resulting from the software error may, by a user agreement, not be permitted to be retained by the organization for a period longer than 6 months. Accordingly, that data parcel may be sent to a namespace 330A governed by a data retention attribute specifying that any data storage partition created in association with the namespace must be deleted (e.g., sent to a trash bin 390 or expunged) with its data after a period of 180 days. The other namespaces 330B, 340A may have different data retention attributes defining retention periods, storage medium, migration policy, etc. for data storage partitions and their data within the namespaces.

Since data may be received by the system 300 on a regular basis, data storage partitions 315A1, 335A1, 335B1, 335B2, etc. may be created, migrated, deleted on a regular basis to meet the needs of the incoming data and/or needs of the organization. For example, a data retention attribute for a namespace 330B may specify that partitions of a selected size are to be created on a weekly basis. Any data received during the week will be stored into the partition. The following week a new partition will be created. After a retention period expires for the weekly partitions, the partitions 335B2, 335B3 and their associated data may be migrated automatically to another namespace.

Since namespaces can be defined in association with physical storage media, old storage media can be easily phased out of the system and new storage media added. For example, new namespaces can be defined to receive incoming data, wherein the new namespaces are associated with new storage media. Old namespaces and their associated storage media can be gracefully retired after all data has been migrated from the old namespace via routine operation of the system.

As will be appreciated from the foregoing example, the data management system provides apparatus and methods for dynamically and automatically managing retention of data, so that data retention can be matched to data storage resources available to an organization and to the needs of the organization.

V. Conclusion

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention may be implemented in any of numerous ways. For example, the embodiments may be implemented using hardware, software or a combination thereof. When implemented in software, the software code may be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media may be transportable, such that the program or programs stored thereon may be loaded onto one or more different computers or other processors to implement various aspects of the present invention as discussed above. As used herein, the term "non-transitory computer-readable storage medium" encompasses only a computer-readable medium that may be considered to be a manufacture (i.e., article of manufacture) or a machine.

The terms "program" or "software" are used herein in a generic sense to refer to any type of computer code or set of computer-executable instructions that may be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed on at least one computing device, the method for performing data retention the method comprising:

receiving first data and a first manifest associated with the first data, the first manifest identifying first data retention attributes for the first data, where the first data retention attributes identify how storage of the first data is to be managed within a first namespace that has at least a portion of the first data retention attributes;

creating, based on the first manifest, first partition metadata that identifies at least first storage partition attributes for at least one first storage partition;

forwarding the first data and the first partition metadata to the first namespace;

creating automatically the at least one first storage partition associated with the first namespace, the at least one first storage partition having at least the first storage partition attributes identified in the first partition metadata;

storing the first data in the at least one first storage partition; and automatically migrating data from the first storage partition to a second storage partition associated with a second namespace responsive to an expiration of the first storage partition, where the second storage partition is separate from the first storage partition, and where the second namespace is distinct from the first namespace.

2. The method of claim 1, wherein the first manifest is defined by a user of at least one of the at least one computing device.

3. The method of claim 1, wherein the first manifest identifies a retention period for the first storage partition or the first data for storage.

4. The method of claim 1, wherein the first manifest identifies a storage medium type for the first storage partition or the first data for storage.

5. The method of claim 1, wherein the act of automatically migrating data from the first storage partition is in accordance with at least one data retention attribute defined for the first namespace.

6. The method of claim 1, wherein the act of automatically migrating further comprises generating code configured for migrating the data from the first storage partition to the second storage partition.

7. The method of claim 1, wherein the act of automatically migrating further comprises transforming the data in the first storage partition having a first XML representation to a second XML representation suitable for storing the data in the second storage partition.

8. The method of claim 1, wherein the act of automatically migrating occurs responsive to an expiry of the first storage partition.

9. The method of claim 1, wherein the expiry is defined for all partitions in the first namespace.

10. The method of claim 1, wherein the first partition metadata identifies at least one restriction for the data.

11. The method of claim 1, wherein the data for storage comprises data representative of software operational error originating from a remote computing device.

12. The method of claim 1, further comprising monitoring, by the at least one processor, access frequency to the first storage partition, and wherein the automatically migrating is based at least in part upon the access frequency.

13. A data management system comprising at least one computing device and at least one software module together configured for performing actions comprising:

receiving first data and a first manifest associated with the first data, the first manifest identifying first data retention attributes for the first data, where the first data retention attributes identify how storage of the first data is to be managed within a first namespace that has at least a portion of the first data retention attributes;

creating, based on the first manifest, first partition metadata that identifies at least first storage partition attributes for at least one first storage partition;

forwarding the first data and the first partition metadata to the first namespace;

creating automatically the at least one first storage partition associated with the first namespace, the at least one first storage partition having at least the first storage partition attributes identified in the first partition metadata;

storing the first data in the at least one first storage partition; and automatically migrating data from the first storage partition to a second storage partition associated with a second namespace responsive to an expiration of the first storage partition, where the second storage partition is separate from the first storage partition, and where the second namespace is distinct from the first namespace.

14. The data management system of claim 13, wherein the first data retention attributes are predefined by a user of the data management system.

15. The data management system of claim 13, where the first data retention attributes identify at least one retention period.

16. The data management system of claim 13, wherein the first data retention attributes identify acts to be performed for data in the first storage partition upon expiry of the first storage partition.

17. The data management system of claim 13, wherein the automatically migrating further comprises:

generating code configured for migrating data from the first storage partition to the second storage partition; and transforming a first XML representation of the data in the first storage partition to a second XML representation.

18. At least one non-transitory computer-readable medium including instructions that, when executed by at least one computing device, cause the at least one computing device to perform actions of a data management system, the actions comprising:

receiving first data and a first manifest associated with the first data, the first manifest identifying first data retention attributes for the first data, where the first data retention attributes identify how storage of the first data is to be managed within a first namespace that has at least a portion of the first data retention attributes;

creating, based on the first manifest, first partition metadata that identifies at least first storage partition attributes for at least one first storage partition;

forwarding the first data and the first partition metadata to the first namespace;

creating automatically the at least one first storage partition associated with the first namespace, the at least one first storage partition having at least the first storage partition attributes identified in the first partition metadata;

storing the first data in the at least one first storage partition; and automatically migrating data from the first storage partition to a second storage partition associated with a second namespace responsive to an expiration of the first storage partition, where the second storage partition is separate from the first storage partition, and where the second namespace is distinct from the first namespace.

19. The at least one non-transitory computer-readable medium of claim 18, wherein the first data retention attributes are predefined by a user of the data management system.

20. The at least one non-transitory computer-readable medium of claim 18, the actions further comprising:

generating code configured for migrating data from the first storage partition to the second storage partition; and transforming a first XML representation of the data in the first storage partition to a second XML representation.

\* \* \* \* \*